March 4, 1952   J. MAY ET AL   2,587,871
HOUSE TRAILER HEATING SYSTEM
Filed March 28, 1949    2 SHEETS—SHEET 1
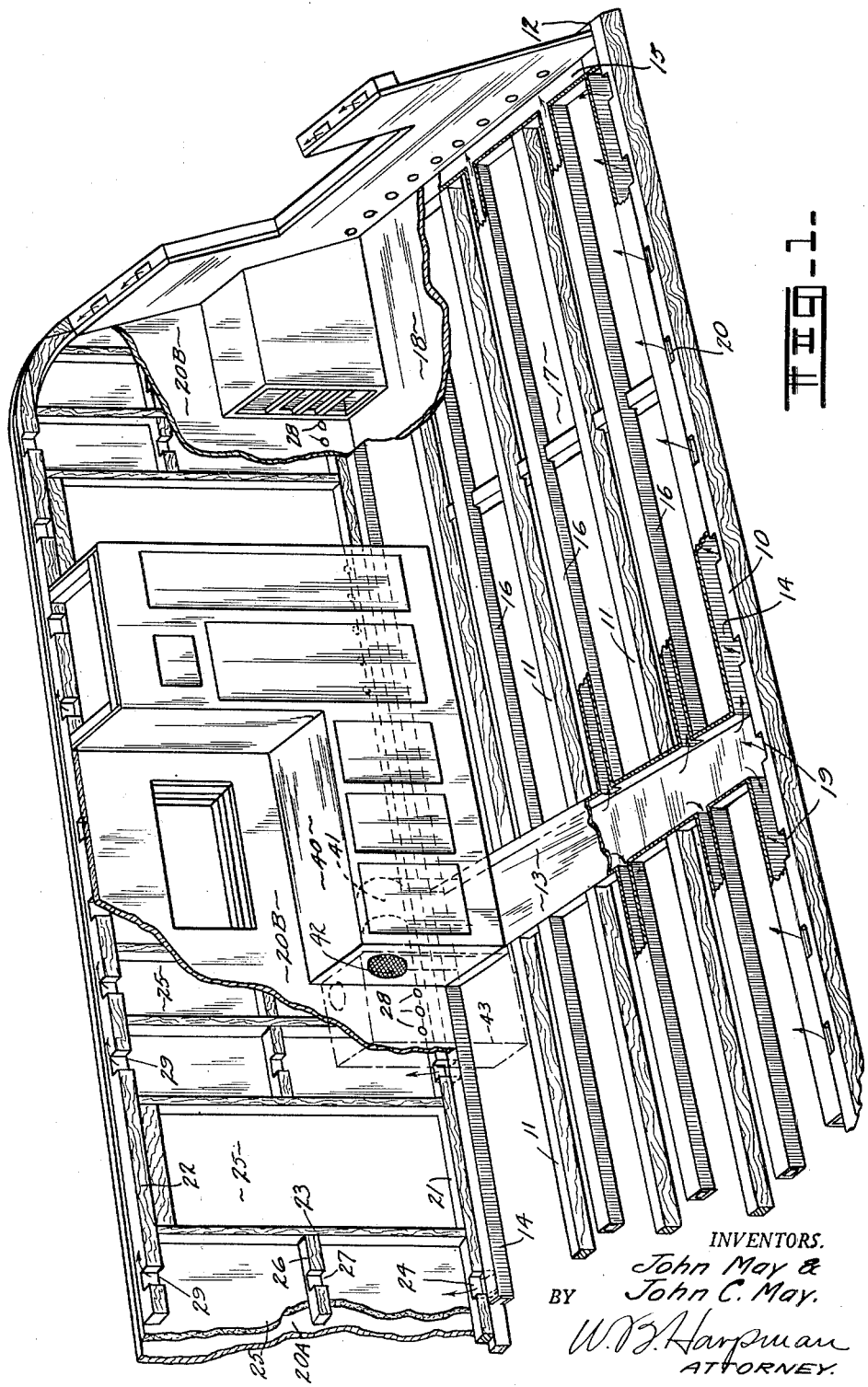
INVENTORS.
John May &
John C. May.
BY W. J. Harpman
ATTORNEY.

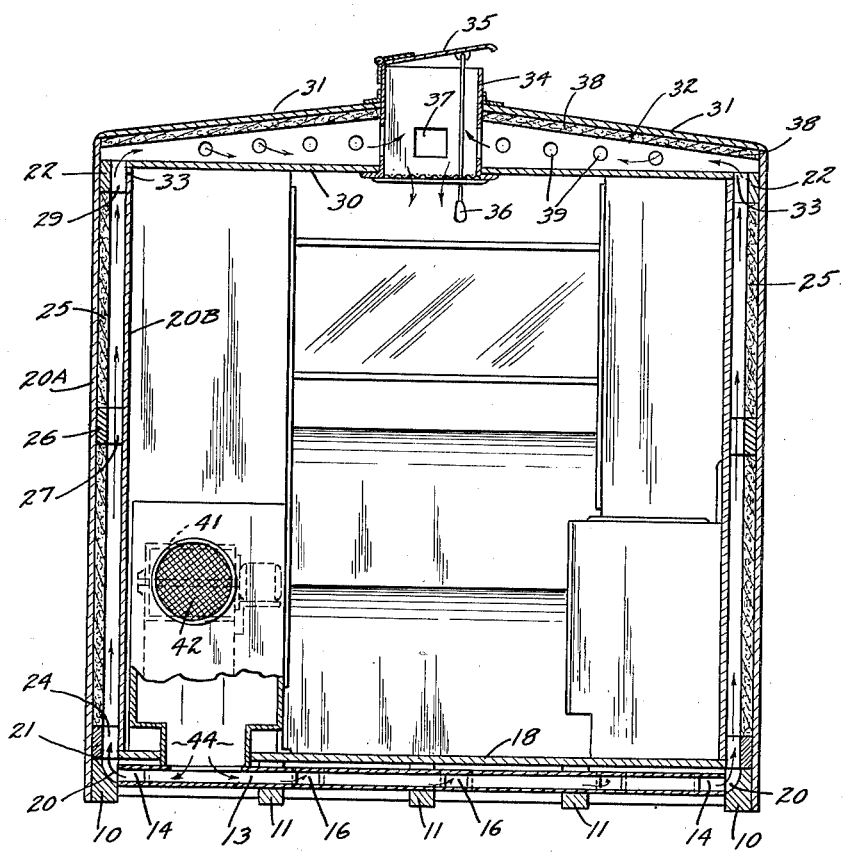

Patented Mar. 4, 1952

2,587,871

UNITED STATES PATENT OFFICE 2,587,871

HOUSE TRAILER HEATING SYSTEM

John May and John C. May, Youngstown, Ohio

Application March 28, 1949, Serial No. 83,954

4 Claims. (Cl. 237—43)

This invention relates to house trailers and more particularly to house trailers having built-in heating systems.

The principal object of the invention is the provision of a house trailer construction incorporating a built-in heating system.

A further object of the invention is the provision of a combination radiant and convection heating system for house trailers.

A still further object of the invention is the provision of a house trailer construction incorporating radiantly warmed floor, wall and ceiling portions and utilizing forced warm air as a heating medium.

A still further object of the invention is the provision of a combination radiant and convection heating system for house trailers utilizing forced warm air as a heating and ventilating medium.

The house trailer construction shown and described herein relates to an improved construction providing radiantly heated floor, wall and ceiling areas and combining means for heating the radiant areas of the trailer and ventilating the interior of the trailer simultaneously.

It is well known that house trailers present difficult heating problems primarily by reason of their exposed nature as the walls, ceiling and floor areas are generally directly exposed to the weather and at the same time space in the house trailer is limited which makes the installation of a conventional heating system difficult such as are employed in dwelling houses and the like. The combination of these difficulties render the average house trailer uncomfortable in cold weather. An additional problem exists in the restricted air space becoming heavily laden with moisture and depositing that moisture in the form of condensation and subsequently ice is formed on the inner surfaces of the floors and walls of the trailer.

The several problems presented in properly heating and ventilating a house trailer are met in the present disclosure in that all of the wall, floor and ceiling areas comprise radiant heating panels of relatively shallow depth and utilize the area normally existing in such constructions so as to eliminate the necessity of placing additional heating means within the trailer itself.

House trailers formed in accordance with the present invention are characterized by having uniformly warmed floors, walls and ceilings and at the same time providing an even, gentle flow of warmed air through the interior of the trailer which may be recirculated or vented to the exterior of the trailer as desired thereby achieving practical control of heating and ventilating the trailer. The system is so devised that the structural portions of the trailer commonly used act as ductwork for the majority of the combination radiant and convection heating and ventilating system.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a perspective view of a portion of a floor, side and end wall of a trailer incorporating the heating system.

Figure 2 is a vertical transverse section of a trailer incorporating the heating system.

By referring to the drawings and Figure 1 in particular it will be seen that a floor area is defined by a framework including a pair of side sills 10 and a plurality of joists 11 spaced with respect to one another and the side sills 10 end running longitudinally of the trailer and terminating at end sills 12. The side sills 10 and joists 11 are formed in an integral unit and adapted to be carried on a suitable supporting framework (not shown). The joists 11 are notched midway between their ends to permit the installation of a transverse duct 13 which is wider at one end than at its other end. The duct 13 is open at its ends and communicates with a pair of distributing ducts 14 which are positioned adjacent each of the side sills 10 and extend the full length of the house trailer.

A pair of secondary distributing ducts 15 are formed one at each end of the trailer and a plurality of tubular members 16, preferably of rectangular cross section, establish communication between the duct 13 and the secondary distributing ducts 15. It will be observed that the plurality of tubular members 16 are positioned one between each of the joists 11 so that each acts as a heating means for the space defined by the joists 11.

Insulation 17 and a false floor supporting the same are disposed beneath the joists 11 and a floor 18 is positioned on the joists 11. Thus, the areas between the sills 10 and the joists 11 are enclosed at their edges by the distributing duct 14 and the secondary distributing ducts 15. The areas are heated by the positioning of the tubular members 16 therethrough.

It will thus be seen that a warm floor construction has been devised which acts as a radiant heating member by reason of the positioning of the ducts 13, 14, 15 and 16 therein through which warm air is adapted to be circulated.

Still referring to Figure 1 of the drawings it will be seen that each of the side sills is provided with a plurality of notches or openings 19 and that a side wall unit of the trailer is positioned on the floor 18 and comprises a bottom sill 21, a top plate 22 spaced by a plurality of studding 23, the bottom sill 21 being notched as at 24 to register with the notches 20 formed in the side sills 10 heretofore referred to. The floor 18 is also notched out so that communication is established through each of the notches or openings 19 and 24 with the area within the side wall unit 20.

The side wall unit also includes a surface sheet 20A and an insulating panel 25 and an interior inside wall sheet 20B. The space between the interior of the insulating panel 25 and the finish sheet 20B provides a shallow vertically standing chamber between each of the studdings 23 through which warm air from the distributing ducts 14 may flow. The longitudinal framework 26 of the side wall unit 20 is also notched as at 27 so that the warm air may flow the full vertical height of the side wall unit. A plurality of relatively small openings 28 are formed in the interior inside wall sheet 20B and preferably near the lower ends thereof so that warm air may be introduced into the interior of the house trailer therethrough.

The top plates 22 of the side wall unit are notched as at 29 so that the warm air may flow upwardly and out of the side wall unit 20 and, as may best be seen by referring to Figure 2 of the drawings, into the area defined by a ceiling sheet 30 and a roof sheet 31 which are spaced by a plurality of rafters 32. The rafters 32 are preferably crowned so that they are thicker near their centers than at their outermost ends and the ceiling sheet 30 is notched as at 33 in registry with the notches 29 in the top plate 22 so that warm air may flow into the area defined by the ceiling sheet 30 and the roof sheet 31.

A ventilating box 34 is positioned through both the ceiling sheet 30 and roof sheet 31 and is provided with a hinged closure 35 and a manually operated lever 36 for opening and closing the same. Openings 37 are formed in the sides of the box 34 and communicate with the area between the ceiling sheet 30 and the roof sheet 31, it being observed that a layer of insulating material 38 is disposed immediately beneath the roof sheet 31 so that air entering the hollow ceiling portion of the house trailer may flow downwardly into the trailer through the box 34 when the closure 35 is closed or upwardly out of the trailer when the closure 35 is open.

It will thus be seen that in the winter, warm air introduced through the structure just described will heat the floor, walls and ceiling of the trailer and provide radiant heating therein and at the same time the warm air may be introduced into the trailer for recirculation. When it is desired to ventilate the trailer the closure 35 may be opened and the air in the trailer ventilated through the use of the same heating system. In the summer, cool air introduced into the system will effectively ventilate the trailer and maintain it at a much lower temperature than would otherwise be the case.

Still referring to Figure 2 of the drawings it will be seen that the rafters 32 are provided with a plurality of openings 39 so that the hollow roof portion of the house trailer is provided with inter-communicating means for the air introduced thereinto. The end walls of the trailer, a portion of one of which is shown in Figure 1, are formed in a manner exactly like the side wall unit 20 heretofore described and are heated by communication with the secondary distributing ducts 15 heretofore referred to.

By referring to Figure 1 of the drawings a cabinet 40 in the trailer may be seen such as one of those commonly installed over one of the wheel houses (not shown) and encloses a blower 41 which has an intake opening 42 in one side of the cabinet 40. The outlet of the blower 41 is in communication with the wide end of the duct 13 and the inlet 42 may obviously be connected with the jacket or casing of a suitable warm air furnace 43 such as is shown in dotted lines in Figure 1.

In Figure 2 of the drawings the communication between the duct 13 and the blower 41 may be seen to comprise a passageway 44.

It will thus be seen that a practical and efficient combination radiant and convection heating system has been disclosed which is particularly adapted for house trailer constructions in that warm air introduced into the system heats the floor area by radiation and the wall and roof areas by convection and thereby enables them to act as radiant heating units with respect to the interior of the house trailer. The system also provides means for heating or cooling within the trailer and for ventilating the trailer at all times.

The heating system is particularly adapted for installation in house trailers wherein the floor, wall and ceiling portions are formed as independent units for subsequent assembly as by bolting the same together. The registering notches in the various units provide the necessary communication for the heating system disclosed herein.

It will thus be seen that the house trailer heating system described herein meets the several objects of the invention.

Having thus described our invention, what we claim is:

1. A heating system for a house trailer having hollow floor, side wall and ceiling portions and comprising a main closed distributing duct in the said hollow floor and a plurality of secondary distributing ducts positioned in the said hollow floor and about the edges thereof and communicating only with the said main duct, the secondary distributing duct about the edges of said floor having openings therein communicating with the walls and the walls having openings communicating with the interior of the trailer and with the ceiling area, ventilator boxes positioned in the hollow ceiling and communicating with the interior of the trailer and exterior of the trailer, the ventilator boxes having openings communicating with the hollow ceiling whereby air introduced into the said ducts will radiantly heat the said floor and heat the hollow walls and ceiling by convection and provide ventilation for the interior of the trailer.

2. A house trailer construction including a floor having side sills and end sills having longitudinally extending joists therebetween, an outer wall secured therebelow and a floor secured thereabove to form a hollow floor, a closed transverse duct positioned in said hollow floor and a distributing duct positioned along each of the said side and end sills and a plurality of closed secondary distributing ducts communicating with the said transverse duct and the said distributing ducts and positioned one between each of the said joists, the said floor having openings in the edges thereof and communicating with the said distributing ducts and said secondary distributing ducts therethrough, and means for introducing heated air into the said transverse duct whereby the same will flow through the said transverse duct and secondary distributing ducts to said distributing ducts to radiantly heat the said hollow floor and be discharged upwardly through the openings in the edge of the said floor into the walls to heat the same by convection.

3. A house trailer construction including a floor having side sills and end sills and having longitudinally extending joists therebetween, an outer wall secured below the said joists and a floor secured above the joists to form a hollow floor construction, a transverse duct positioned in the said hollow floor and in communication with a source of warm air, a plurality of secondary ducts positioned in the said hollow floor and in communication with the said transverse duct, a distributing duct positioned along each of the said side and end sills and in communication with the said secondary ducts, the said transverse and secondary ducts forming air passageways separate and distinct from the area within the hollow floor and closed with respect thereto, the said floor having openings in the edges thereof in communication with the said distributing ducts, vertically standing hollow walls on the said floor and in communication with the said openings whereby warmed air from the said source introduced into the said transverse duct will flow through the said secondary ducts to the said distributing ducts and from the same through the openings in the said floor and into the said vertically standing walls whereby the hollow floor area is heated only by radiation of the said transverse duct and secondary ducts and whereby the walls are heated by convection occurring by the direction of warm air thereinto.

4. A house trailer construction including a hollow floor, hollow walls and ceiling thereover, the said hollow floor having side sills and end sills and joists extending therebetween, an outer wall secured to the bottom of the said joists and a floor secured to the top of the said joists to form said hollow floor, a main duct positioned in said hollow floor and a distributing duct positioned along each of the said side and end sills and a plurality of secondary distributing ducts communicating with the said main duct and the said distributing ducts and spaced with respect to one another in the said hollow floor, the said main duct and secondary distributing ducts communicating only with one another and with the said distributing duct openings in the edges of the said floor, the said distributing duct communicating only with the said openings, the said hollow walls registering with the said openings in the floor and means for introducing heated air into the said main duct whereby the same will flow through the said main duct and the secondary distributing ducts to the said distributing duct to radiantly heat the said hollow floor and be discharged upwardly through the openings in the edge of the floor into the hollow walls to heat the same by convection.

JOHN MAY.
JOHN C. MAY.

REFERENCES CITED

The following references are of record in the file of this patent:

UNITED STATES PATENTS

| Number | Name | Date |
| --- | --- | --- |
| 2,103,990 | Mayer | Dec. 28, 1937 |
| 2,181,814 | Knapp | Nov. 28, 1939 |
| 2,240,951 | Hamjy | May 6, 1941 |
| 2,273,176 | Burt | Feb. 17, 1942 |
| 2,364,220 | Johnson | Dec. 5, 1944 |
| 2,465,184 | Alderman | Mar. 22, 1949 |